United States Patent Office 2,715,146
Patented Aug. 9, 1955

2,715,146

PROCESS AND CATALYST FOR METHYLENE CHLORIDE PRODUCTION

Edward Boaden Thomas and Frank Hindley, Spondon, near Derby, England, assignors to British Celanese Limited, a corporation of Great Britain No Drawing. Application May 17, 1950,
Serial No. 162,606

Claims priority, application Great Britain June 1, 1949

1 Claim. (Cl. 260—658)

This invention relates to the manufacture of organic compounds and is, more particularly, concerned with the manufacture of chlorinated paraffin hydrocarbons.

According to the present invention, chlorinated paraffin hydrocarbons containing two or more chlorine atoms in the molecule are produced by subjecting a corresponding compound containing less chlorine to reaction with chlorine in the presence of sulphur mono-chloride.

The invention is of particular value in connection with the chlorination of the normally gaseous paraffin hydrocarbons, i. e. methane, ethane, propane and butane, and the corresponding mono-chlorinated compounds. The use of sulphur mono-chloride as catalyst in the production of these compounds, besides leaving to high yields and conversions at relatively low temperatures, has particular advantage in that by its use the technically more valuable compounds of a relatively low degree of chlorination can be obtained without the simultaneous production of large quantities of the more highly chlorinated products. The invention is, therefore, of especial importance in the utilisation of methane from which methyl chloride and methylene chloride can, if desired, be obtained by the use of the invention together with some chloroform and little or no carbon tetrachloride, and the invention will therefore be described more particularly in this connection.

The chlorination reaction is preferably carried out in the liquid phase, the reaction medium comprising sulphur mono-chloride. While the sulphur mono-chloride may be diluted with an inert organic liquid, e. g. a highly chlorinated hydrocarbon such as carbon tetrachloride, this does not appear to be necessary or even desirable as higher through-puts appear to be possible when using undiluted sulphur mono-chloride. The reaction may be carried out very satisfactorily in a column containing the sulphur mono-chloride and through which the chlorine and hydrocarbon or chlorinated hydrocarbon starting material are passed concurrently. In order to make the utmost use of the sulphur mono-chloride, such a column can, with advantage, be packed, e. g. with beads, so that the sulphur mono-chloride is extended to fill a longer column than would otherwise be possible. However, the use of materials of high surface/weight ratio as extenders for the sulphur mono-chloride, e. g. active carbon, is liable to lead to the development of uncontrollable reaction conditions. The chlorination reaction is exothermic and consequently such a column should be provided with adequate cooling tubes or a cooling jacket. In addition, the reaction zone should be shielded from actinic light; otherwise the chlorination is liable to become uncontrollable and even explosive.

As indicated, relatively low temperatures can be used with success in carrying out the process of the invention, and in general it is preferred to use temperatures below 100° C. Methane can be chlorinated to produce methyl chloride together with a little methylene chloride and substantially no chloroform or carbon tetrachloride in a very satisfactory manner at temperatures in the neighbourhood of 20° C., e. g. from 18 to 25° C. On the other hand, the use of such low temperatures for chlorinating methyl chloride leads to the production of substantial quantities of chloroform and carbon tetrachloride. For instance, at 20° C. using equimolecular proportions of methyl chloride and chlorine, approximately equal quantities of the chlorine used appear in the product as methylene chloride, chloroform and carbon tetrachloride. At higher temperatures, however, the production of carbon tetrachloride falls off, while the production of chloroform and methylene chloride increases. The best temperature for the production of methylene chloride appears to be in the neighbourhood of 70° C., e. g. 65 to 75° C., at which temperatures the major part of the product consists of methylene chloride together with half as much or rather less of chloroform and quite a small quantity of carbon tetrachloride. Intermediate temperatures result in the production of less carbon tetrachloride than is obtained at, say, 20° C. but more chloroform, e. g. at 50° C., again using equimolecular proportions of methyl chloride and chlorine, carbon tetrachloride formed is approximately half that formed at 20° C., the chloroform double and the methylene chloride shows rather less than a 50% increase, so that rather more chloroform is produced than methylene chloride under these conditions.

Bearing in mind the facts set out above with regard to the desirability of using a temperature of about 65 to 75° C. to produce methylene chloride, the preferred method of achieving the production of methylene chloride as the main product, starting from methane, is to carry out the operation in two stages, the methane first being chlorinated to produce methyl chloride together with a little methylene chloride and the product of this stage then being further chlorinated under conditions which are optimum for the production of methylene chloride. In this way the production of carbon tetrachloride can, if desired, be kept to a minimum and the chlorine consequently used more economically.

It will be apparent that the use of sulphur mono-chloride enables the chlorination to be controlled so that the chlorine is used to best advantage. The ratio of the reactants is also of importance in this connection. Thus, equimolecular proportions of hydrocarbon or chlorinated hydrocarbon, where this is the starting material, and chlorine are generally satisfactory, but where it is desired to avoid the production of more highly chlorinated products, for example where, starting from methane or methyl chloride, the chief product desired is methylene chloride, it is advisable to use a deficiency of chlorine as compared with that theoretically required. Thus, it is preferred to use at least twice as much methyl chloride or methane as is theoretically required where the desired product is methylene chloride or methyl chloride respectively, and an even greater excess of the chlorinated hydrocarbon or hydrocarbon may be used, for example three to four times the theoretical quantity. By this means, and using a reaction temperature of 65° to 75° C., it is possible when chlorinating methyl chloride to obtain as products methylene chloride and chloroform in the molecular proportions of 4:1 or greater together with little or no carbon tetrachloride. The use of much larger excesses of chlorinated hydrocarbon or hydrocarbon does not, however, appear to offer substantial advantage since the advantage of reduction in proportion of highly chlorinated product is necessarily offset by the reduced production rate which results from the use of the smaller chlorine through-put. However, if desired, to suppress as far as possible the formation of these more highly chlorinated products, such a larger excess of the chlorinated paraffin or paraffin hydrocarbon used as starting material, e. g. up to five times the theoretical quantity, may be used. On the other hand, where the desired product is the highly chlorinated product, for example where it is desired to manufacture carbon tetrachloride from methyl chloride, an excess of chlorine over that theoretically required may, if desired, be used. In general, however, it is preferred to have present a deficiency of chlorine as in this case it has been found that the sulphur monochloride is so efficient as a catalyst that it is possible to operate so that the whole of the chlorine is utilised so that its recovery from the products of the process is avoided.

The following examples illustrate the invention:

Example 1

Dry methyl chloride and chlorine in the molecular proportions of 3.5:1 are introduced into the base of a vertical tubular reactor packed with glass beads and containing liquid sulphur mono-chloride. The reaction vessel is surrounded by a jacket through which water is circulated so as to maintain the reaction vessel at a temperature of about 70° C. and which serves to shield the reaction vessel from actinic light.

120 grams of methyl chloride are passed into the reaction vessel per hour per litre of reaction space, the reaction space being the volume of the sulphur mono-chloride and the space above the liquid which is filled with spray during the passage of the reactant mixture.

The products issuing from the reaction vessel comprise methylene chloride, chloroform, and a little carbon tetrachloride, together with hydrogen chloride which is also produced in the process. For each 100 molecular proportions of methylene chloride produced there are also produced 26 molecular proportions of chloroform and 3.75 of carbon tetrachloride, the conversion to methylene chloride based on the chlorine used corresponding to about 61% of that theoretically obtainable.

Using the conditions described, the production rate amounts to 32.4 grams of methylene chloride per hour per litre of reaction space.

Example 2

Using the apparatus described in Example 1 and introducing a mixture of methyl chloride and chlorine in the molecular proportions of 3.6:1 at a greater rate than in Example 1, it is possible to achieve a considerably higher production rate and to eliminate the formation of carbon tetrachloride.

When introducing 215 grams of methyl chloride per hour per litre of reaction space, there are produced with a reaction temperature of 70° C. 14 molecular proportions of chloroform for each 100 molecular proportions of methylene chloride with a conversion to methylene chloride based on the chlorine used of more than 78% of that theoretically possible, no carbon tetrachloride being produced. These results can be obtained with a production rate of 113 grams of methylene chloride per hour per litre of reaction space, but after running for a period of about 6 hours nearly 90% of the sulphur monochloride has left the reaction space and must be separated from the products and returned thereto for the continuation of the process.

Example 3

Using the apparatus described in Example 1, methane and chlorine in the molecular proportions of 2.2:1 are introduced at a rate corresponding to 45 grams of methane per hour per litre of reaction space, the reaction vessel being maintained throughout the process at a temperature of 20° C.

The product obtained consists of unchanged methane together with methyl chloride and a trace of methylene chloride, rather more than half the chlorine passed being used up, the methyl chloride being produced at a rate of about 36 grams per hour per litre of reaction space.

By increasing the time of contact and/or by increasing the ratio of methane to chlorine, more complete utilisation of the chlorine can be obtained.

Having described our invention, what we desire to secure by Letters Patent is:

Process for the production of methylene chloride with relatively small simultaneous production of more highly chlorinated products, which comprises bringing methyl chloride and chlorine together in liquid sulphur monochloride maintained between 65 and 75° C.

References Cited in the file of this patent

UNITED STATES PATENTS

| Number | Name | Date |
|---|---|---|
| 1,757,100 | Strosacker | May 6, 1930 |
| 2,156,039 | Dachlauer et al. | Apr. 25, 1939 |
| 2,168,260 | Heisel et al. | Aug. 1, 1939 |
| 2,323,227 | Levine et al. | June 29, 1943 |